F. W. ULRICH.
GARDEN TOOL.
APPLICATION FILED MAY 18, 1911.
1,026,133.
Patented May 14, 1912.
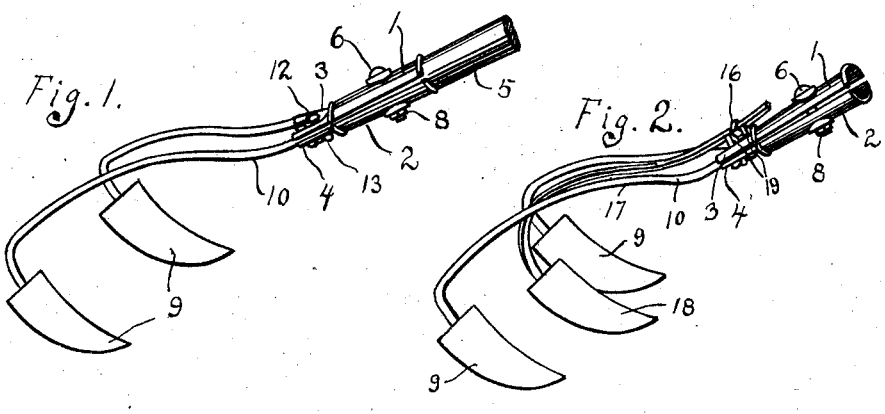
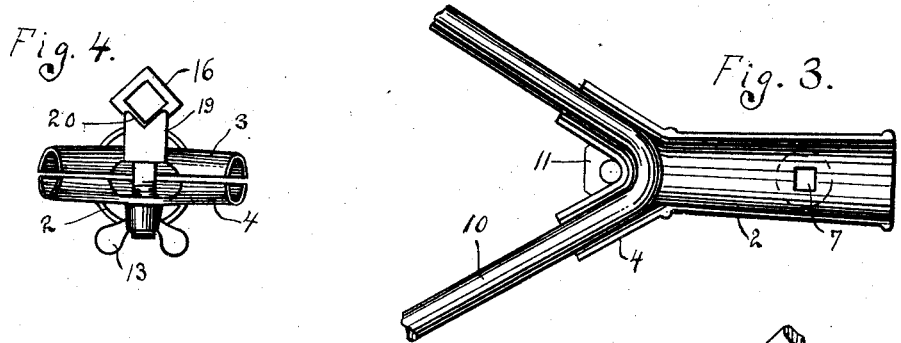
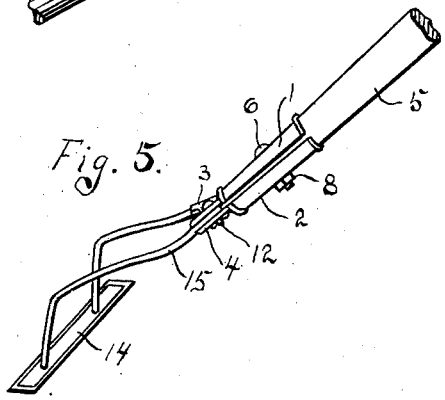
Witnesses
Inventor
Frederick W. Ulrich,
By Walter N. Haskell,
his Attorney

UNITED STATES PATENT OFFICE.

FREDERICK W. ULRICH, OF ROCK FALLS, ILLINOIS.

GARDEN-TOOL.

1,026,133.  Specification of Letters Patent.  Patented May 14, 1912.

Application filed May 18, 1911. Serial No. 628,061.

*To all whom it may concern:*

Be it known that I, FREDERICK W. ULRICH, a citizen of the United States, residing at Rock Falls, in the county of Whiteside and State of Illinois, have invented certain new and useful Improvements in Garden-Tools, of which the following is a specification.

My invention has reference to garden tools, and relates chiefly to the means for attaching the tool to the handle, such means being strong and effective, and permitting the removal of either the tool or handle, if desired.

My device is specially adapted for use with garden implements which are provided with a continuous shank, of substantially V-shaped pattern, and can therefore be employed with various tools of the class mentioned, by interchanging such tools.

The form, arrangement and operation of the various parts comprising my invention will more fully appear in the following specification, and in the drawings accompanying the same, in which:

Figure 1 is a perspective showing my device as embodied in a hand cultivator. Fig. 2 is a similar view, showing a modified form thereof. Fig. 3 shows one of the sections of the socket in detail. Fig. 4 is an end view of my invention looking from the tool end thereof. Fig. 5 shows a modified use of my device.

Similar parts are indicated by corresponding reference numbers throughout the several figures.

The invention comprises a socket, formed of two similar semi-cylindrical sections 1 and 2, and a forked socket integral therewith, formed of two similar sections 3 and 4. The parts 1 and 2 embrace the lower end of a handle 5, and are clamped tightly thereto by means of a bolt 6, passing through openings 7 in the parts 1 and 2, and provided with a nut 8. The diameter of the handle socket is somewhat less than that of the end of the handle which is held thereby, and in case of the handle becoming loose from the shrinkage of the wood, or other cause, the parts 1 and 2 can be more closely drawn together by tightening the nut 8, until the handle is again tightly clamped in place.

In Fig. 1 my device is shown in use with a pair of cultivator shovels 9, united by a V-shaped shank 10, the inner end of which is adapted to be held in the forked socket, as is more clearly shown in Fig. 3. Each of the parts 3 and 4 is provided with a web 11, perforated to permit the passage of a bolt 12, provided with a thumb-nut 13, whereby the parts of the forked socket can be tightly clamped upon the shank 10.

In Fig. 5 my invention is shown as it appears when in use with a shuffle-hoe, wherein 14 is the blade of the hoe and 15 the shank thereof, formed similarly to the shank 10, and held between the sections 3 and 4 of the forked socket. It is obvious that by loosening the bolts 6 and 12, and removing the lower section of the handle socket and forked socket connected therewith the cultivator shank can be removed and replaced by that of the hoe, or the reverse. It is likewise true that the socket can be employed with any implement which is provided with a shank of corresponding form, such as a rake-head.

In Fig. 2 is shown a construction of my device wherein the bolt 12 is replaced by an eye-bolt 16, in which is held the shank 17 of an auxiliary shovel 18. The shank 17 is square in cross-section, the eye of the bolt 16 conforming in shape therewith, and on each side of the bolt on the part 3 is fixed a lug 19, having in its upper face an angular recess 20 in which the shank 17 rests. Such shank is thus held rigidly in place. By placing the shank 17 in the eye-bolt in an inverted position the shovel 18 can be used independently of the shovels 9, for the purpose of opening a furrow or similar work. When desired to close the furrow the cultivator is inverted and the shovels 9 employed. Other auxiliary implements can be held in place by the eye-bolt 16 and appurtenant parts, such as a small shield to keep plants from being covered with earth from the shovels 9.

It will be apparent that by the use of my invention one handle can be employed with a variety of tools, one of which can be readily exchanged for the other. The construction of the socket also makes it possible to easily replace a handle in case it becomes necessary to do so, on account of the breakage of one handle, or for other cause. The parts can also be easily packed in separate bundles for the purpose of shipping or storing the tools, the cultivator parts fitting tightly together into a compact space, and the handles being formed into bundles of desired and convenient size. By uniting the cultivator blades with a continuous shank there is no possibilty of such blades turning sidewise when in use.

What I claim as my invention and desire to secure by Letters Patent of the United States, is:

1. The combination with a tool provided with a V-shaped shank of a forked socket, formed in two parts, and adapted to engage said shank; a handle socket, integral with said forked socket, also formed in two parts; means for detachably uniting the parts of said handle socket; and means for detachably uniting the sections of said forked socket.

2. In a garden tool, the combination of a pair of cultivator shovels; a V-shaped shank uniting the same; a forked socket formed in two similar sections, adapted to hold said shank; an eye-bolt uniting said sections; an auxiliary shovel, provided with a shank capable of being held in said eye-bolt; recessed lugs on one of said sections engaging the shank of said auxiliary shovel; a handle socket, integral with said forked socket, also formed in two similar sections, and means for uniting the parts of said handle socket.

In testimony whereof I affix my signature in presence of two witnesses.

FREDERICK W. ULRICH.

Witnesses:
  W. N. HASKELL,
  F. G. GIFFROW.

---

Copies of this patent may be obtained for five cents each, by addressing the "Commissioner of Patents, Washington, D. C."